Patented Aug. 20, 1935

2,011,789

UNITED STATES PATENT OFFICE 2,011,789

CONDENSATION PRODUCT OF THE BENZANTHRENE SERIES

Carl Wulff and Ernst Roell, Ludwigshafen-on-Rhine, Germany, assignor to General Aniline Works, Inc., New York, N. Y., a corporation of Delaware No Drawing. Application January 22, 1934, Serial No. 707,849. In Germany January 25, 1933

8 Claims. (Cl. 260—168)

The present invention relates to condensation products of the benzanthrene series and a process of producing same.

We have found that valuable condensation products are obtained by subjecting to a condensing treatment compounds capable of reacting like benzanthrene, whereby mainly a condensation of two molecules of the initial materials takes place. According to this process one molecular proportion of a compound capable of reacting like benzanthrene is condensed with one molecular proportion of the same or a different compound capable of reacting like benzanthrene. Compounds capable of reacting like benzanthrene are benzanthrene itself, dihydrobenzanthrene (which is formed for example in the production of benzanthrene from alpha-benzylnaphthalene), alpha-benzylnaphthalene (which first yields benzanthrene and/or dihydrobenzanthrene during the condensation) and benzanthrenes or dihydrobenzanthrenes substituted in the position marked X in the following formula

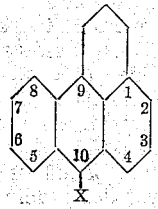

by substituents which are split off during the reaction, namely hydroxy groups or halogen atoms. The two molecules to be condensed may be equal or different as is described in detail in the following. 1 molecular proportion of benzanthrene may be reacted with 1 molecular proportion of benzanthrene or dihydrobenzanthrene or 10-monochlorbenzanthrene (or 10-monochlordihydrobenzanthrene) or 10-dichlorbenzanthrene or 10-hydroxybenzanthrene (or 10-hydroxydihydrobenzanthrene) or 10-dihydroxybenzanthrene (which is usually called benzanthrone). 1 molecular proportion of 10-monochlorbenzanthrene may be condensed with 1 molecular proportion of 10-monochlorbenzanthrene or 10-monohydroxybenzanthrene or the corresponding dihydro compounds; also two molecular proportions of 10-monohydroxybenzanthrene may be condensed with one another. However, if one component is benzanthrone or 10-dichlorbenzanthrene the other component must not be substituted in the 10-position. The preparation of benzanthrene (and dihydrobenzanthrene) from alphabenzylnaphthalene and the condensation according to the present invention may be carried out in one single operation.

Besides the said compounds other materials may be used, such as dinaphthylmethane, benzylanthracene, benzylphenanthrene, naphthylphenanthrylmethane, benzobenzanthrene and the derivatives of these compounds substituted by halogen, oxygen (=O, —OH) and also alkyl derivatives of the compounds described.

The reaction products are hydrocarbons which probably contain two radicles of the initial material, for example two benzanthrene radicles which possibly are combined in the 10-positions. Also if initial materials substituted in the 10-position, for example 10-chlorbenzanthrene, are employed, the final products are substantially free from such substituent, i. e. free from chlorine. The statements concerning the possible or probable constitution of the final products are given to facilitate the understanding of the reaction but are not intended to restrict the subject-matter of the application.

The condensing treatment may be effected by heating the initial materials or by acting thereon with condensing agents, preferably at elevated temperature, the condensation conditions such as temperature and kind of the condensing agent, being so energetic or the treatment carried on for so long that a condensation mainly takes place in which 2 molecules of the initial material unite together.

If the reaction be effected by heating the initial materials (for example benzanthrene) or mixtures (for example of benzanthrene and benzanthrone) alone, high temperatures, usually above 300° and even of from 600° to 800° C., are often necessary. If the condensation be effected by treatment with condensing agents at elevated temperatures, usually temperatures below 300° C. are suitable. As condensing agents may be mentioned for example chemical condensing agents, such as sulphur, selenium, lead oxide, sodamide and aluminium chloride, or catalysts having a condensing action (which term includes dehydrogenating catalysts), such as difficultly reducible metal oxides, bleaching earths, as for example tonsil or silica gel, or phosphoric acid.

The process may be carried out in the liquid or gas phase in the presence or absence of diluents with or without the employment of increased or reduced pressure. Diluents favor the fine division of the condensing agents. The energetic working conditions necessary in each case may be readily ascertained by a preliminary experiment. If the reaction be carried out in the gas phase, suitable diluents are for example nitrogen, steam and carbon dioxide.

While by heating benzylnaphthalene in the presence of a catalyst, benzanthrene or mixtures thereof with dihydrobenzanthrene are mainly obtained, a dark-colored substance having a green fluorescence is obtained when the heating is especially protracted or when higher temperatures than those for the said reaction are selected or when otherwise more energetic conditions are employed for example the period of reaction is prolonged. The new product may be separated from the unreacted parts by dissolution in xylene and precipitation with petroleum ether. The analysis and molecular weight of the substance point to a compound which is formed from 2 molecules of benzanthrene by union in the 10-positions by means of a double linkage. The same compound is obtained by charging benzanthrene or dihydrobenzanthrene over the said catalyst under the same working conditions.

The same compound may also be obtained by treating benzanthrene or dihydrobenzanthrene or their mixtures with oxidizing or dehydrogenating agents, such as sulphur or lead oxide; the same result is also achieved by heating 1 molecular proportion of benzanthrene with 1 molecular proportion of benzanthrone at about 300° C., if desired while adding a condensing agent, such as tonsil or phosphoric acid. This condensation may be carried out not only with benzanthrene and benzanthrone, but also with other hydrocarbons selected among those enumerated above and the corresponding oxygen derivatives.

The said substance may also be obtained by heating 1 molecular proportion of 10-dichlorbenzanthrene with 1 molecular proportion of non-chlorinated benzanthrene at about 100° C. The same substance may also be obtained simply by heating 10-monochlorbenzanthrene alone, if desired in the presence of diluents.

The new substances are solid, brown to red-brown crystalline powders melting in the pure state above 250° C. which are soluble in aromatic hydrocarbons and in halogenated aromatic or aliphatic hydrocarbons and difficultly soluble in methyl alcohol, ethyl alcohol, benzine and paraffin oil. The substances are distinguished by an extremely high coloring power and strong fluorescence, so that substances containing only 0.0001 per cent thereof still have a marked fluorescence and usually green color. Even in such slight concentration, the said substances still give an intense green coloration with sulphuric acid, and this constitutes a characteristic coloration by which they may be readily detected. On account of the above stated properties the substances are eminently suitable for coloring and distinguishing bulk products treated in great quantities. They are especially suitable for coloring fuel mixtures as for example of benzine and benzene, to distinguish them, or for coloring lubricating oils, in order to impart to them the appearance of certain natural and commercial products. When so treated, such organic solvents show an intense orange coloration and green fluorescence.

For the purpose of coloring benzines, lubricating oils and the like it is not necessary to use the pure products but the unpurified materials may be used as they are obtained for example from the thermal condensation.

The following examples will further illustrate the nature of this invention but the invention is not restricted to these examples. The parts are by weight.

Example 1

If 1 kilogram of alpha-benzylnaphthalene vapor be led per hour over each liter of a catalyst consisting of magnesium oxide provided with a surface layer of graphite (by leading thereover benzine vapors at 800° C.), at from 750° to 780° C., a product is obtained which consists to the extent of 40 per cent of a black substance having a green fluorescence which may be employed directly or after purification by dissolution in aromatic hydrocarbons for coloring benzine. It consists probably of a condensation product of 2 molecules of benzanthrene. The product has a strong green fluorescence. In addition there are formed about 40 per cent of benzanthrene and dihydrobenzanthrene as well as a little naphthalene and toluene.

The same condensation product described is also obtained by leading benzanthrene or dihydrobenzanthrene over the said catalyst under the same working conditions instead of benzylnaphthalene. The yield in this case is better.

Example 2

100 parts of a mixture of benzanthrene and dihydrobenzanthrene (obtainable for example by leading vaporized alphabenzylnaphthalene over oxides not reducible to metal under the reaction conditions and preferably coated with lustrous carbon at high temperatures, advantageously in the presence of diluent gases such as carbon dioxide or water vapor) are mixed with 20 parts of elementary sulphur and heated to 280° C. The substance described in Example 1 is formed with a strong evolution of hydrogen sulphide. By extracting the excess of sulphur or by purification with solvents, the product may be readily obtained free from sulphur.

Instead of sulphur, lead oxide may be employed.

Example 3

100 parts of the mixture of benzanthrene and dihydrobenzanthrene obtained as described at the top of Example 2 are dissolved in 200 parts of carbon tetrachloride, 70 parts of chlorine then being led in. The solution first becomes colored red-brown and then an insoluble substance (10-monochlorbenzanthrene) separates out. The mixture obtained is boiled under a reflux condenser, and hydrochloric acid escapes in large amounts. The undissolved product passes into solution and the latter has a strong dark green fluorescence. By filtration and distilling off the carbon tetrachloride from the filtrate, a residue is obtained which consists mainly of the condensation product having a green fluorescence and is free from chlorine.

Example 4

A mixture of 20 parts of benzanthrene and 22 parts of benzanthrone is heated for 3 hours at about 320° C. With the splitting off of water a condensation product is formed which has an intense green color and fluorescence. If a condensing agent, as for example tonsil or phosphoric acid, be employed, the reaction may be carried out by heating at about 250° C.

Example 5

100 parts of 10-hydroxydihydrobenzanthrene (which is identical with the compound called hydroxy-trimethylenephenanthrene) are heated with 50 parts of tonsil at between 200° and 250° C.

Condensation with the splitting off of water occurs. Besides a little benzanthrene and dihydrobenzanthrene a substance is obtained which according to analysis is dibenzanthrene. By sublimation in the high-vacuum the compound may be purified. By recrystallization from toluene it is obtained in a crystalline form.

*Example 6*

50 parts of 10-dichlorbenzanthrene (obtainable by acting on benzanthrone with phosphorus pentachloride) and 40 parts of benzanthrene are heated in 500 parts of chlorbenzene at between 100° and 120° C. Hydrogen chloride is split off and a product is formed which according to analysis is dibenzanthrene.

What we claim is:—

1. A process of producing condensation products of the benzanthrene series which comprises subjecting to a condensing treatment one molecular proportion of a compound selected from the group consisting of benzanthrene, dihydrobenzanthrene, alpha-benzylnaphthalene, and benzanthrenes or dihydrobenzanthrenes substituted in the 10-position by up to two hydroxy groups or halogen atoms with one molecular proportion of a compound selected from the said group the reactants being so chosen that at most two halogen atoms or hydroxy groups are contained in the reaction mixture.

2. A process of producing condensation products of the benzanthrene series which comprises subjecting to a condensing treatment at elevated temperatures one molecular proportion of a compound selected from the group consisting of benzanthrene, dihydrobenzanthrene, alpha-benzylnaphthalene, and benzanthrenes or dihydrobenzanthrenes substituted in the 10-position by up to hydroxy groups or halogen atoms with one molecular proportion of a compound selected from the said group the reactants being so chosen that at most two halogen atoms or hydroxy groups are contained in the reaction mixture.

3. A process of producing condensation products of the benzanthrene series which comprises subjecting to a condensing treatment at between 300° and 800° C. one molecular proportion of a compound selected from the group consisting of benzanthrene, dihydrobenzanthrene, alpha-benzylnaphthalene, and benzanthrenes or dihydrobenzanthrenes substituted in the 10-position by up to two hydroxy groups or halogen atoms with one molecular proportion of a compound selected from the said group the reactants being so chosen that at most two halogen atoms or hydroxy groups are contained in the reaction mixture.

4. A process of producing condensation products of the benzanthrene series which comprises subjecting benzanthrene to a condensing treatment at between 600° and 800° C.

5. A process of producing condensation products of the benzanthrene series which comprises subjecting a mixture of benzanthrene and benzanthrone to a condensing treatment at about 320° C.

6. A process of producing condensation products of the benzanthrene series which comprises chlorinating a mixture of benzanthrene and dihydrobenzanthrene in carbon tetrachloride and subjecting the solution of chlorination product to condensation by heating to boiling.

7. Condensation products obtained by condensing a compound selected from the group consisting of benzanthrene, dihydrobenzanthrene, alpha-benzylnaphthalene, and benzanthrenes or dihydrobenzanthrenes substituted in the 10-position by up to two hydroxy groups or halogen atoms with one molecular proportion of a compound selected from the said group the reactants being so chosen that at most two halogen atoms or hydroxy groups are contained in the reaction mixture, being from brown to brown-red powders, soluble in sulphuric acid to give a green coloration, soluble in aromatic hydrocarbons and chlorinated aliphatic hydrocarbons, difficultly soluble in methyl and ethyl alcohol, benzine and paraffin oil and imparting to the said solvents already in very low concentrations an intense orange coloration and green fluorescence.

8. Condensation products obtained by condensing a compound selected from the group consisting of benzanthrene, dihydrobenzanthrene, alpha-benzylnaphthalene, and benzanthrenes or dihydrobenzanthrenes substituted in the 10-position by up to two hydroxy groups or halogen atoms with one molecular proportion of a compound selected from the said group the reactants being so chosen that at most two halogen atoms or hydroxy groups are contained in the reaction mixture, containing probably 2 benzanthrene radicles per molecule being from brown to brown-red powders, melting above 250° C., soluble in sulphuric acid to give a green coloration, soluble in aromatic hydrocarbons and chlorinated aliphatic hydrocarbons, difficultly soluble in methyl and ethyl alcohol, benzine and paraffin oil and imparting to the said solvents already in very low concentrations an intense orange coloration and green fluorescence.

CARL WULFF.
ERNST ROELL.